United States Patent [19]
Rodriguez

[11] Patent Number: 5,174,093
[45] Date of Patent: Dec. 29, 1992

[54] MECHANIZED NON-DESTRUCTIVE CROP HARVESTING MACHINE

[76] Inventor: Henry Rodriguez, Rte. 1, Box 73K, McNeal, Ariz. 85617

[21] Appl. No.: 747,132

[22] Filed: Aug. 19, 1991

[51] Int. Cl.⁵ .................. A01D 45/22; A01D 45/24; A01D 45/30
[52] U.S. Cl. .................. 56/327.1; 56/13.2; 56/128; 56/330
[58] Field of Search .................. 56/13.2, 33, 34, 35, 56/40, 48, 126, 127, 128, 129, 130, 327.1, 328.1, 330, DIG. 19

[56] References Cited

U.S. PATENT DOCUMENTS

| | | |
|---|---|---|
| 1,303,120 | 5/1919 | Scott et al. |
| 1,713,397 | 5/1929 | Rountree .................. 56/13.2 X |
| 2,374,162 | 4/1945 | Bell |
| 2,495,417 | 1/1950 | McConnel et al. |
| 2,874,528 | 2/1959 | Esch |
| 3,073,098 | 1/1963 | Farrar et al. .................. 56/128 X |
| 3,473,304 | 10/1969 | Morgan |
| 3,830,048 | 8/1974 | Ervin .................. 56/331 |
| 4,196,570 | 4/1980 | Rodriguez .................. 56/126 |
| 4,977,736 | 12/1990 | Price, Jr. .................. 56/330 |

Primary Examiner—David J. Bagnell
Attorney, Agent, or Firm—LaValle D. Ptak

[57] ABSTRACT

A mechanized harvesting machine, particularly suitable for picking or harvesting vegetables such a peppers or tomatoes employs a harvesting member having a rotating shaft aligned transversely to the direction of movement of the machine above the row of plants which are to be harvested. First and second picking members are mounted in spaced relationship on the shaft on opposite sides of a row of plants having a crop to be harvested. The picking members are simultaneously rotated, and each have a plurality of arcuate picking elements on them. The picking elements extend into the space between the two picking members, and operate to strip the crop from the plants while leaving the plants in a relatively undisturbed condition after they have been picked. A flat platform or guide is located beneath the picking members on each side of the row of plants to be picked, and high-pressure air is directed over this platform to move harvested crops from beneath the picking members to a location at the rear of the harvesting member, from which the crops are removed by means of a conveyor.

25 Claims, 3 Drawing Sheets

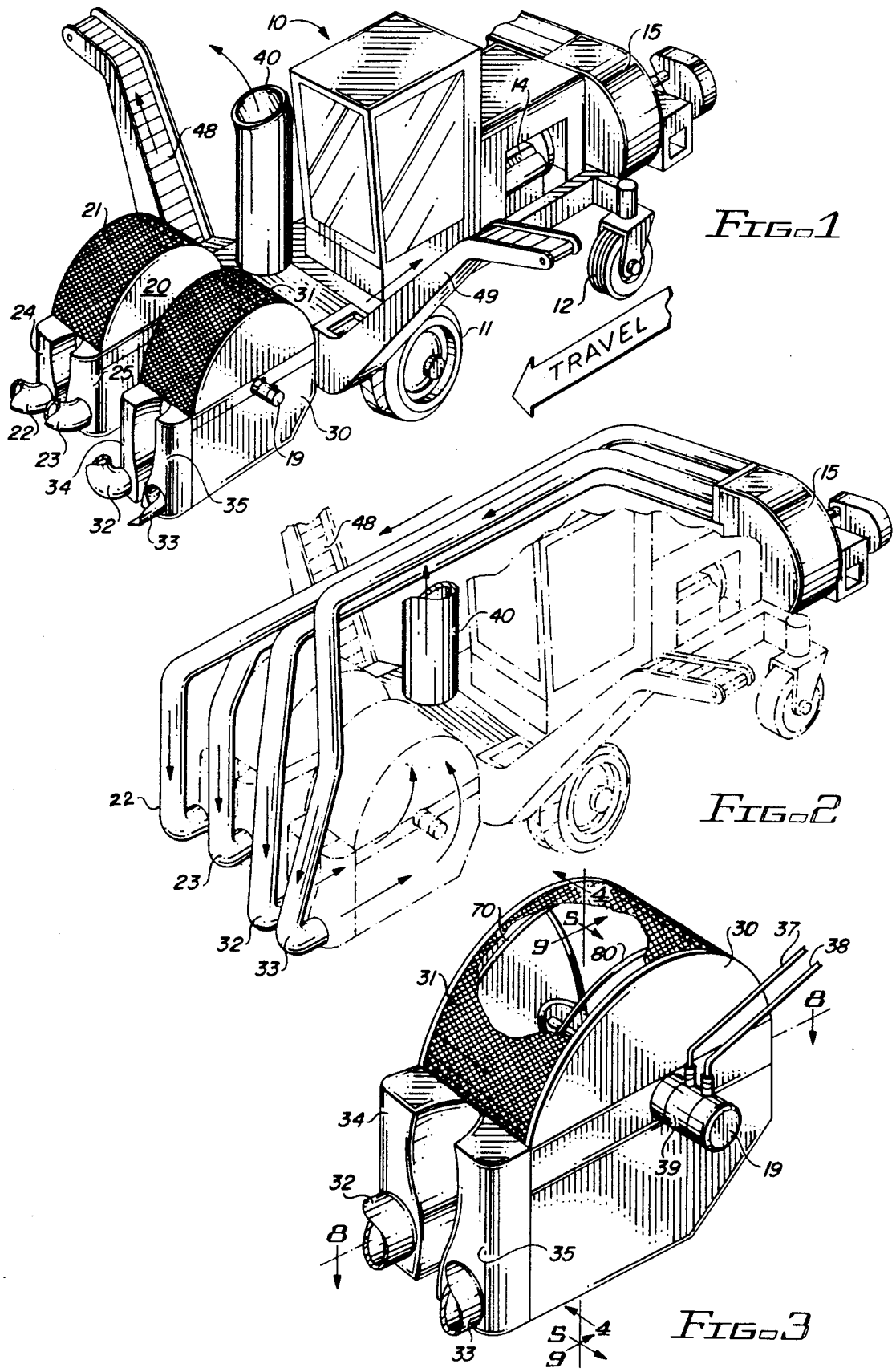

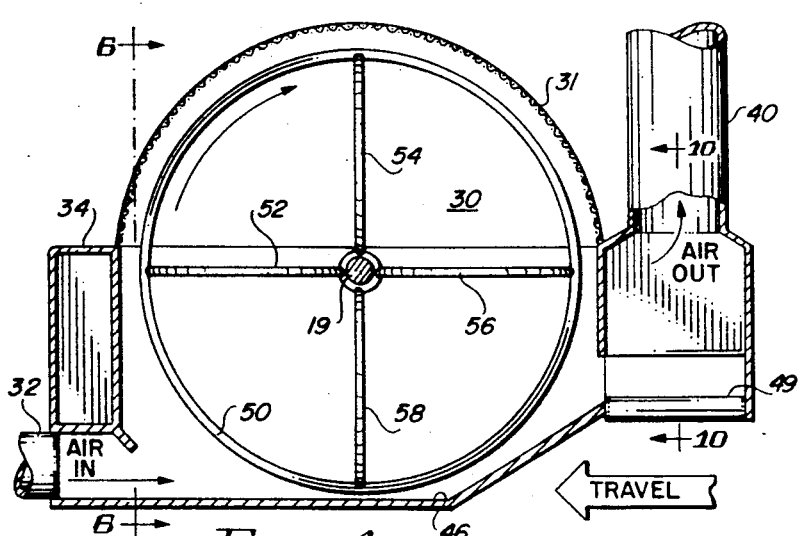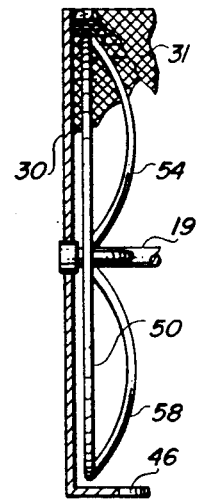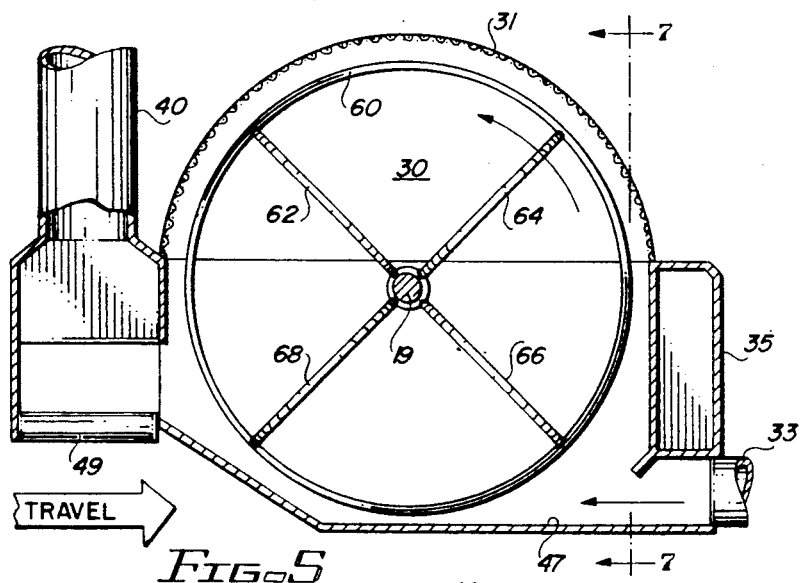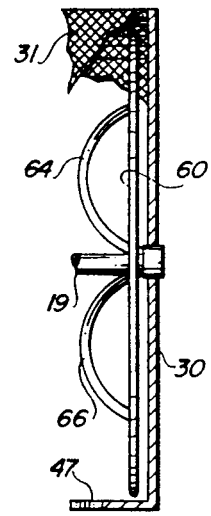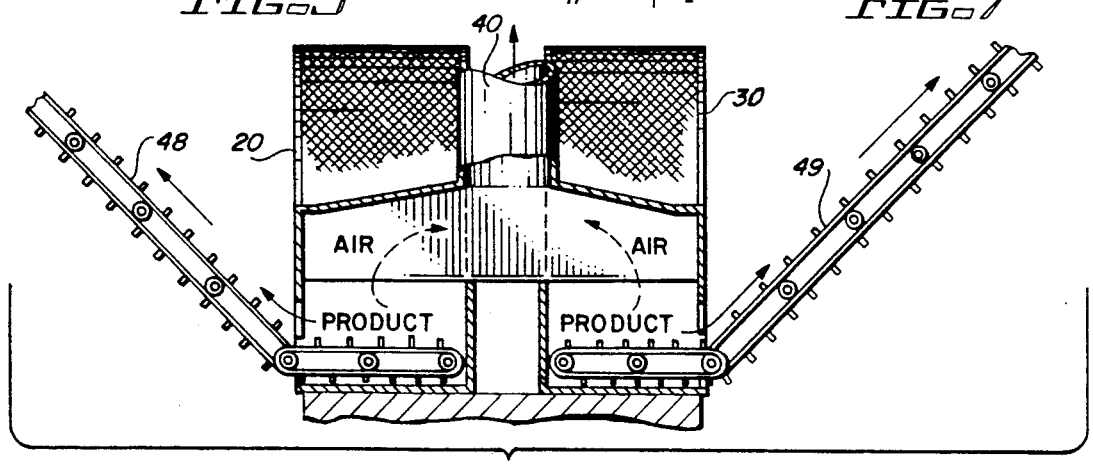

MECHANIZED NON-DESTRUCTIVE CROP HARVESTING MACHINE

BACKGROUND

Mechanized automatic harvesting machines are widely used in large-scale farming operations in the grain farming regions of the world, particularly in the United States and Canada. These machines permit a significant reduction of the man hours required to harvest a crop, and allow a single farmer to farm large acreages, which were impossible in the labor-intensive farming industry at the turn of the century in the United States and, even today, in many parts of the world.

Although large-scale mechanized farming and harvesting operations are well known in conjunction with grain farming, such mechanized farming has eluded vegetable farmers in most cases. Most vegetables are harvested by hand. This requires a large number of workers per acre of crop to accomplish the harvesting, since the crop generally has only a very short time (a matter of a very few days) in most cases, when it is at its peak for harvesting. As labor costs continuously increase, the cost of vegetables produced on such farms continues to rise accordingly.

Some progress has been made to alleviate the high cost of labor in harvesting vegetable crops. In particular, with respect to the harvesting of peas and beans, mechanical harvesting machines have been developed, which fairly effectively permit the harvesting of a crop. One such machine, directed to a pea picker, is disclosed in the patent to Bell U.S. Pat. No. 2,374,162. The machine of Bell uses a combination helix and beater-fingers all located on a single rotating shaft to pick peas or beans, and the like. The plants are gathered up by the input end of the helix, which picks them up and tears them apart, and supplies them to a cutter which cuts them off. Beaters, located in the next section of the machine, then knock off the peas or beans. In the case of peas, the beaters strike the pods hard enough to break the pods open; so that the peas fall out. The peas or beans, which are harvested by this machine, then drop onto a conveyer beneath it. The remainder of the plants then are moved upwardly and outwardly through another part of the machine, from which they are disposed. The machine of this patent, however, destroys the plants bearing the crops to be harvested; so that multiple harvesting of the same plants cannot be effected.

A somewhat different approach is disclosed in the patent to Esch U.S. Pat. No. 2,874,528. This patent is directed to a bean picker which employs vertically rotating helixes to lift the bean plants upwardly and snap the beans off at the top end of travel with a hook located at the top of each of the helixes. Multiple rotating helixes are employed, and considerable damage to the plants occurs.

Another approach is disclosed in the patent to Morgan U.S. Pat. No. 3,473,304. This patent is directed to a vegetable picker which has a slot for guiding the plant into a location next to a large helix. The helix serves to compact all of the leaves and vegetables into a rather tight bunch. The plant is moved to a location adjacent a counter-rotating brush, which strips off the beans, peas or other vegetables from the plant. The helix itself is not the picking element, but merely locates the crops adjacent the picking brush. Although the machine of Morgan is designed with an intent to preserve the plant, large numbers of leaves necessarily are stripped from the plant during the contact with the stripping brush. In addition, branches and stems of the plant are frequently broken. As a result, the condition of the plant after the harvesting machine has passed over it, is substantially weakened. In many cases, the plant is damaged to such an extent that it is incapable of producing a second crop.

Although the machines of the patents described above have been used with some degree of success for picking beans and peas, mechanized picking machines for peppers (such and green and red chiles, bell peppers, and the like) and tomatoes, capable of harvesting the crop without damaging it or destroying the plant, or both, had not been developed until the machine disclosed in Rodriguez U.S. Pat. No. 4,196,570. The machine of that patent employs a picking mechanism mounted on a central rotatable shaft, which is located above the row of plants to be picked. The shaft is longitudinally aligned parallel with the row. The shaft has a helical guide attached to it, with the spacing between adjacent turns of the helix selected to be equal to the spacing between each plant in the row of plants to be picked. A number of arcuate picking elements are mounted on the helix, and extend between the outer turns of the helix and the shaft to engage the peppers or other vegetables on the plant to pick them as the machine is moved over the row of plants. This machine has proved very effective for picking peppers with minimum damage to the plant. As a consequence, the plant can be used to produce subsequent crops for harvest, resulting in substantial savings.

A disadvantage of the machine of Rodriguez U.S. Pat. No. 4,196,570, however, is that the rotation speed of the helix and the location of each turn of the helix must be carefully synchronized with the movement of the machine and the spacing of the plants to avoid tearing up or uprooting any of the plants in the row to be harvested. If the helix rotation is out of synchronization with the movement of the machine over the row, or if the plant-to-plant spacing is different from the turn-to-turn spacing of the helix, substantial damage to the plants can occur. Thus, it is necessary for the design of the machine to be precisely related to the plant spacing, and it is also necessary for the operator of the machine to exercise skill and care in threading the machine through the row of plants to effect the picking operation.

It is desirable to harvest crops from pepper plants and tomato plants and the like with a mechanized harvesting machine which overcomes the disadvantages of the prior art mentioned above. Such a machine ideally should harvest the crop without damage to the plants, and also without damaging the crop, and should leave the plant in a strong and healthy condition after the harvesting operation; so that the plant can be used to produce subsequent crops. In addition, it is desirable that such a machine may be universal in its application to the harvesting of a crop, and not require any particular synchronization on the part of operator to effect the harvesting operation.

SUMMARY OF THE INVENTION

Accordingly, it is an object of this invention to provide an improved mechanized harvesting machine.

It is another object of this invention to provide an improved mechanized harvesting machine which harvests the crop without damaging the plant from which the crop is harvested.

It is an additional object of this invention to provide an improved mechanized pepper harvesting machine.

It is a further object of this invention to provide an improved mechanized pepper harvesting machine which minimizes damage to the crop being harvested, and which leaves the plant in a strong and healthy condition after the harvesting operation.

In a preferred embodiment of the invention, a mechanized mobile harvesting machine includes a harvesting member mounted on it. This harvesting member has a rotatable shaft mounted substantially parallel to the ground over which the machine is moved, and placed transversely of the direction of movement of the machine. First and second spaced-apart picking members, generally in the form of open circular hoops, are mounted in a spaced-apart relationship for simultaneous rotation on the shaft. Each of these picking members is located in planes which are perpendicular to the shaft. In addition, each of the picking members has a plurality of arcuate picking elements on it; and these picking elements extend a predetermined distance into the space between the first and second picking members for removing the crop from the plants as the machine moves along the row of plants and the shaft is rotated to rotate the picking members.

BRIEF SUMMARY OF THE DRAWINGS

FIG. 1 is a perspective view of a preferred embodiment of the invention;

FIG. 2 is a perspective view similar to that of FIG. 1, showing a detail of one of the features of the invention;

FIG. 3 is an enlarged perspective view of a portion of the embodiment shown in FIG. 1;

FIG. 4 is a cross-sectional view taken along the line 4—4 of FIG. 3;

FIG. 5 is a cross-sectional view taken along the line 5—5 of FIG. 3;

FIG. 6 is a transverse cross-sectional view taken along the line 6—6 of FIG. 4;

FIG. 7 is a transverse cross-sectional view taken along the line 7—7 of FIG. 5;

FIG. 10 is a partially cut-away sectionalized view illustrating a detail of the embodiment of the machine shown in FIGS. 1 and 8 in particular.

DETAILED DESCRIPTION

Figure 8:
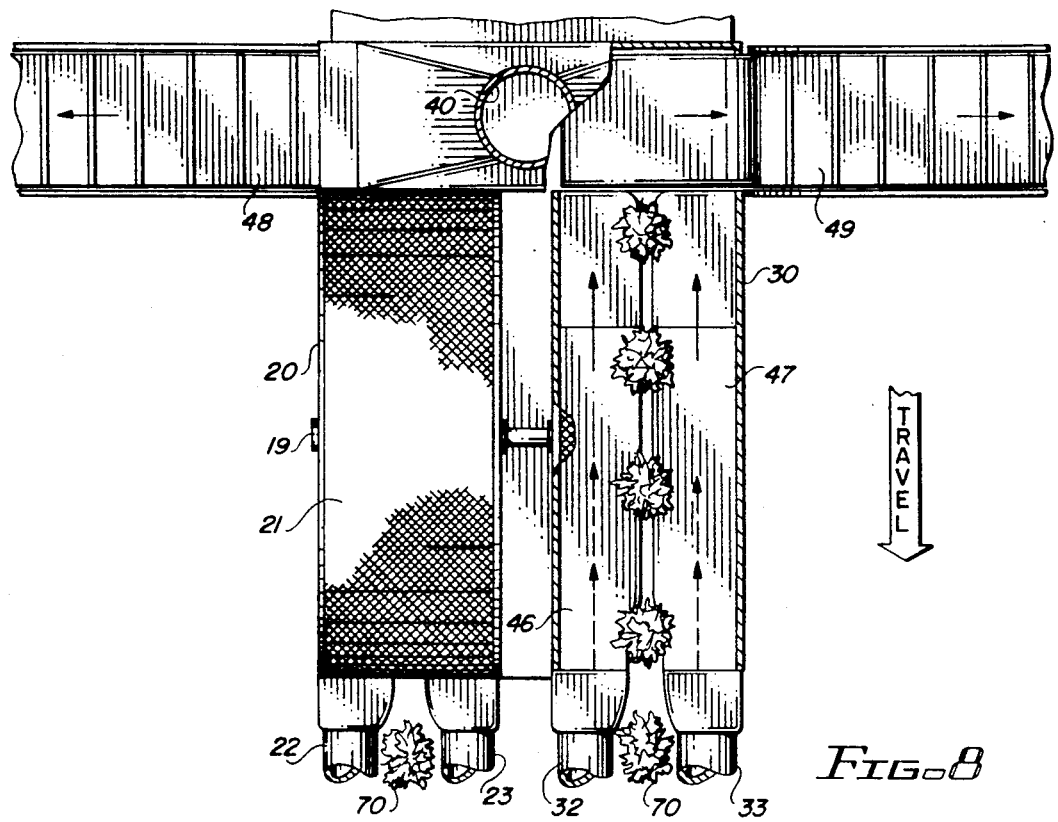
FIG. 8 is a top partial cross-sectional view of the embodiment shown in FIG. 1.

Reference now should be made to the drawings in which the same reference numbers are used throughout the different figures to designate the same components. FIG. 1 is a top front perspective view of a mechanized mobile harvesting machine, constructed in accordance with a preferred embodiment of the invention. The harvesting machine 10 includes a conventional cab mounted on a chassis having front drive wheels 11 and rear steering wheels 12 mounted on it. The engine 14 for propelling the machine is located at the rear of the cab. At the rear of this engine, a large volume fan 15 is located, and is rotated by a power take-off on the engine 14. The fan 15 is used to supply air under pressure to four conduits 22, 23, 32, and 33. These conduits or pipes supply air into the lower front sides of a pair of harvesting members 20 and 30 mounted on the front of the machine 10. Air which passes through the conduits 22, 23, 32, and 33 passes through the harvesting member, in a manner more clearly explained subsequently, and exits through an exit pipe 40 located in front of the cab 10, as shown in FIGS. 1 and 2.

FIG. 3 illustrates a detail of the picking member 30. It should be understood that the harvesting member 20 is identical to the harvesting member 30 in all respects. The harvesting members 20 and 30 have a configuration which is generally in the form of a cylindrical section. A shaft 19 common to both picking elements extends through them, substantially at the center. This shaft 19 is supported by the sides of the harvesting members 20 and 30, which, in turn, are rigidly attached to the front of the tractor or the machine 10. As illustrated in FIG. 3, the shaft 19 is rotated by means of a hydraulic motor 39 supplied with input and output fluid lines 37 and 38, respectively. These fluid lines are operated from a suitable hydraulic source powered from the engine 14 in the machine 10. Alternatively, the shaft 19 could be rotated by any other type of mechanism operated, either directly or indirectly, from the engine 14 in the machine 10.

As shown most clearly in FIGS. 3, 4, and 5, the air supplied through the pipes 32 and 33 passes along a pair of substantially horizontal bottom plates or guides 46 and 47, which are upwardly inclined at the rearmost end, mounted against the front of the tractor portion of the machine 10, and enters a plenum to exit through a pipe 40. This air is supplied in substantial volume, under considerable pressure, to move rapidly along the path indicated in dotted lines in FIG. 8 through the harvesting member 30. A similar path for air flow through the harvesting member 20 is effected from the air which is supplied to it through the pipes 22 and 23.

Located within each of the harvesting members, and attached to the shaft 19, is a pair of picking hoops or rings, illustrated as rings 50 and 60 for the member 30. Similar picking rings are also employed in the picking member 20, although these have not been shown in detail, since to do so is a mere repetition of the showing of the details of the harvesting member 30. These rings, in turn, are supported on the shaft 19 by means of arcuate picking elements, shown as elements 52, 54, 56, and 58 for the ring 50, and shown as elements 62, 64, 66, and 68 for the ring 60, as illustrated in FIGS. 4 through 7.

As is evident from an examination of FIGS. 4 and 5, the picking elements extend outwardly from the planes of the circular loop members 50 and 60 in planes which are perpendicular to the plane of the circular loops. As is apparent from an examination of FIGS. 6 and 7, the arcuate picking elements 52 through 58, and 62 through 68 have a substantial curvature and extend toward one another into the space between the rings 50 and 60, as shown most clearly in FIG. 9. The four picking elements 52 through 58 are spaced apart at 90° intervals about the shaft 19, as are the picking elements 62 through 68. It should be noted, however, that the elements 62 through 68 are offset from the corresponding elements 52 through 58 by 45°; so that there is an alternating operation of these elements on a plant 70 which is to be harvested when the shaft 19 is rotated in the direction of the arrows shown in FIGS. 4, 5, and 9.

Figure 9:
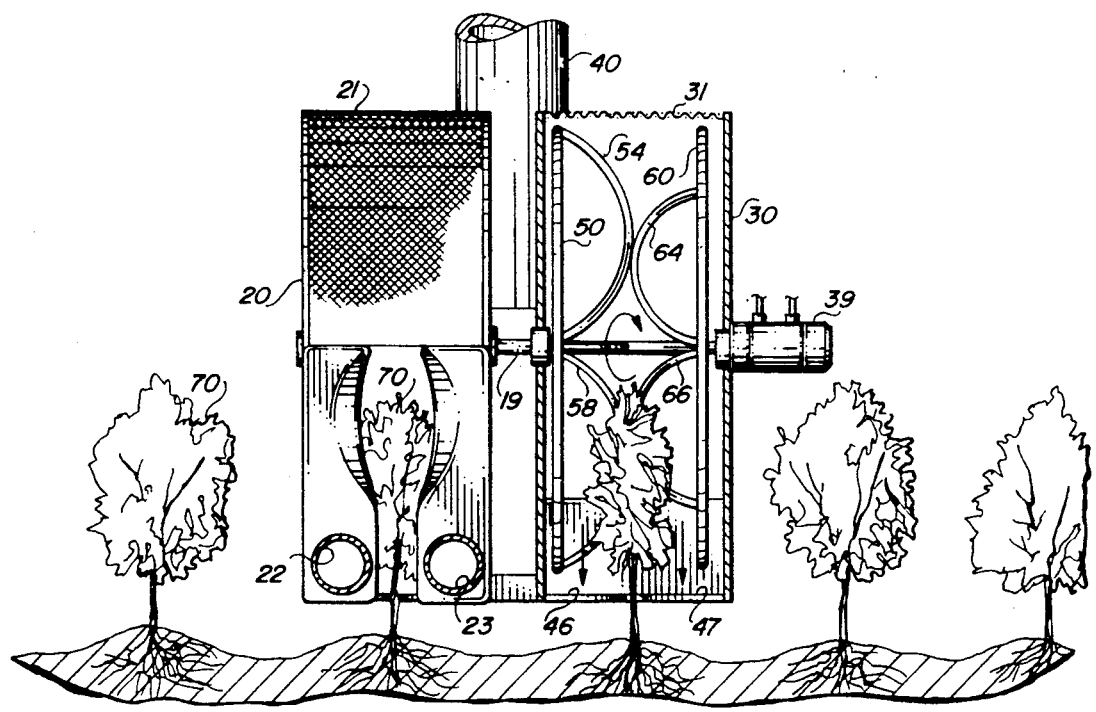
FIG. 9 is partially cut-away front view of the embodiment shown in FIG. 1.

It also is apparent from an examination of FIG. 9 that the picking elements essentially overlap the full amount of the space between the rings 50 and 60; so that the two different groups of elements, 52 through 58 and 62 through 68, alternately engage the plant 70, first on one side and then on the other, to push it back and forth during the picking operation.

As the machine 10 moves in the direction of the arrows shown in FIGS. 1, 4, 5, and 8, the plants 70 are first pushed toward the right by the picking elements 52 through 58, and then toward the left by the elements 62 through 68 in a repeating fashion. As the machine moves forward and the elements rotate in the direction of the arrows, the picking elements 52 through 58 and 62 through 68 move upwardly past the center of the plants, which are guided into the narrow space between the guides 46 and 47, as shown in FIG. 8. This causes the papers, tomatoes or other vegetables hanging on the plant to slide along the picking elements 52 to 58 and 62 to 68, following the curvature of these elements to some point where they snap off. The peppers or tomatoes, or the like, then drop past the picking elements to fall downwardly onto the platforms or guides 46 or 47, depending upon which set of picking elements effected the removal of the vegetable. Each successive picking element of the two offset groups of picking elements contacts the plants to effect this upward stripping motion away from the plant.

This operation rapidly occurs, and the plant 70 is subjected to a back-and-forth, pushing and pulling movement from side to side as it is alternately engaged by the two groups of picking elements 52 through 58 and 62 through 68. Both groups of elements always pick with an upward motion, as the picking operation continues. From an examination of FIG. 8 it can be seen that as the machine moves forward (causing the plant to move relatively backward) the picking elements will ultimately return to strike the leaves of the plant on the downward motion. By this time, however, all of the harvestable crop has been removed, and the resiliency of the plant 70 is unaffected by this downward movement. Once again, because of the arcuate shape of the picking elements, the plant is gently pushed from side to side as the rear or trailing side of the picking elements on the rotating wheels 50 and 60 engage the plant, which then ultimately passes beneath the machine 10 as it moves on in the harvesting operation.

Once the peppers, tomatoes or other crops have been broken loose from the plants by the picking elements, they drop onto the platforms or guides 46 or 47. The air which is blown under high pressure through the conduits 32 and 33 moves the peppers and any other leaves or debris which may have been removed by the picking elements, toward the rear of the machine onto conveyors 48 and 49 associated, respectively, with the harvesting members 20 and 30. The details of the member 30 are shown. As is apparent from an examination of FIGS. 4 and 5, all of the peppers and other materials are moved along the platforms 46 and 47 to a place at the rear of the harvesting member 30 where the peppers or other vegetables, being heavier, are deposited on a conveyor 49 (or the conveyor 48 for the harvesting member 20). The leaves and other lighter debris are blown upwardly and out of the machine through the pipe 40 from the plenum, which is located above the ends of the conveyors 48 and 49.

As is apparent from an examination of FIG. 1, the conveyors 48 and 49 then move the harvested crop upwardly and out to opposite sides of the machine 10 where it may be deposited into bins (not shown) attached to the machine itself, or into trucks which are moving alongside the machine 10 during the harvesting operation. If separate trucks are used, the trucks then are driven to a suitable processing plant or a storage facility, after the truck is filled.

Also, as most clearly shown in FIGS. 1, 3, 4, 5, and 9, the entrances of the row of plants into each of the harvesting members are provided with shields 24, 25, and 34, 35 to serve a dual function. The first function is to prevent any peppers or other vegetables, which are picked by the machine, from being thrown outwardly onto the ground. The inner surfaces of these shields 24, 25, and 34, 35 deflect any vegetables, which might otherwise be thrown out of the machine, back down onto the guides or platforms, such as 46 and 47, and into the airstreams from the pipes 22, 23, and 32, 33 to cause the peppers or other vegetables to be blown backwards along the platforms 46 and 47 to the corresponding conveyors, such as the conveyor 49.

It should be noted that the space between the platforms or guides 46 and 47 is selected to be as narrow as possible, while at the same time permitting sufficient width to allow the stems of the plants being harvested to pass through this space without any damage. In some situations, it may desirable to provide flexible brushes or other suitable extensions along this opening to yield when the plant passes through, but to provide an essentially closed area for the spaces between successive plants 70 in the harvesting operation; so that the harvested crop, such as peppers and the like, does not fall through this opening onto the ground.

It has been found in the operation of a machine 10 constructed in accordance with the one shown in the drawing, that very little crop is lost; while at the same time, a high percentage of the harvestable crop is automatically harvested by the machine. The crop, which is ultimately supplied from the conveyors 48 and 49, is remarkable clean, that is, free from leaves, stems and other debris; so that minimum additional processing is necessary to remove such debris from the desired harvested chiles or other vegetables.

The shrouds 21 and 31, placed over the tops of each of the harvesting members, are provided to catch or deflect any peppers or other crops harvested by the machine which might otherwise be tossed out of the harvesting members. These shrouds 21 and 31 direct the picked crops downwardly onto the platforms 46 and 47 to prevent unnecessary loss of crops.

The picking elements 52 through 58 and 62 through 68 ideally should be formed as open loops in the form of arcuate rods, or the like, as illustrated. This permits the harvested pepper or other crops to easily drop past the picking elements onto the platforms 46 and 47. The diameter of the rods used for the picking elements 52 through 58 and 62 through 68 may vary, but it should be small enough to engage the stems of the peppers to snap off the peppers. At the same time, the diameter of these rods should be large enough to avoid catching any of the leaves of the plants 70, so that the leaves are not torn off the plants. Typically, a rod of 3/16" diameter or so has been found suitable for harvesting pepper plants, such as green chile peppers, red chiles, etc.

The diameter of the rings or loops 50 and 60 also may be varied, but, as is apparent from an examination of FIG. 9, it should be selected to be slightly more than double the height of a plant 70 to be harvested; so that the top of the plant 70 passes beneath the shaft 19, as illustrated in FIG. 9. Consequently, the external dimensions of the machine may be varied in accordance with the particular average size of the crop which is to be harvested by the machine. It also should be noted that the bottom of the machine should run as close as possible to the ground; so that all of the crop-bearing portions of the plant 70 extend into the interior of the machine above the guide plates 46 and 47. In this way, all of the crop is exposed to the operation of the successive picking elements 52 through 58 and 62 through 68, in the manner described previously.

The foregoing description of the invention should be taken as illustrative, and not as limiting. It will be apparent to those skilled in the art that variations, which differ from the embodiment shown and described, may be used without departing from the scope of the invention. For example, the number of picking elements may be varied, and the configuration of the mechanism for carrying the picking elements and rotating them can be varied. The manner in which the harvested crop is moved from beneath the picking elements into the conveyors also may be varied without departing from the true scope of the invention as set forth in the appended claims.

I claim:

1. A mechanized mobile harvesting machine including in combination:
    a harvesting member with a rotatable shaft therein, said shaft mounted substantially parallel to the ground over which the machine is moved, and said shaft placed transversely of the direction of movement of the machine;
    first and second spaced-apart picking members mounted for simultaneous rotation on said shaft, each of said first and second picking member located in planes substantially perpendicular to said shaft; and
    a plurality of arcuate picking elements on each of said first and second picking members, said picking elements on said first and second picking members being radially offset from one another by a predetermined number of degrees, and each of said picking elements extending a predetermined distance into the space between said first and second picking members.

2. The combination according to claim 1 wherein said first and second picking members each comprise a circular member having a predetermined radius attached to said rotatable shaft.

3. The combination according to claim 2 wherein said arcuate picking elements each comprise a rod member with a predetermined overall length which is greater than the radius of said picking members.

4. The combination according to claim 3 wherein said plurality of arcuate picking elements on each of said first and second picking members comprises at least four picking elements, each spaced 90° from one another on each of said picking members.

5. The combination according to claim 4 wherein said picking elements on said first picking member are offset from said picking elements on said second picking member by 45°.

6. The combination according to claim 5 wherein said picking elements on each of said first and second picking members each extend substantially halfway into the space between said first and second picking members, so that plants to be harvested by the machine are pushed and pulled from one side to the other as said shaft rotates transversely over a row of plants.

7. The combination according to claim 6 further including means for rotating said shaft in a direction to cause the rotation of the picking elements to move said picking elements as such elements approach nearest the ground, in the same direction as the direction of movement of the machine.

8. The combination according to claim 7 further including guide means located beneath each of said first and second picking members for preventing crop harvested by the machine from dropping to the ground.

9. The combination according to claim 8 further including means for supplying air under pressure, and means for directing said air under pressure over said guide means to move crop harvested by the machine from said guide means.

10. The combination according to claim 9 further including means adjacent said picking members for removing crops harvested by the machine from the machine.

11. The combination according to claim 9 wherein said removing means includes endless belt conveyor means.

12. The combination according to claim 11 wherein said means for supplying a stream of air under pressure moves harvested crop from said guide means to said conveyor means.

13. The combination according to claim 1 further including guide means located beneath each of said first and second picking members for preventing crop harvested by the machine from dropping to the ground.

14. The combination according to claim 13 further including means for supplying air under pressure, and means for directing said air under pressure over said guide means to move crop harvested by the machine from said guide means.

15. The combination according to claim 14 further including means adjacent said picking members for removing crops harvested by the machine from the machine.

16. The combination according to claim 15 wherein said removing means includes endless belt conveyor means.

17. The combination according to claim 16 wherein said means for supplying a stream of air under pressure moves harvested crop from said guide means to said conveyor means.

18. The combination according to claim 1 wherein said plurality of arcuate picking elements on each of said first and second picking members comprises at least four picking elements, each spaced 90° from one another on each of said picking members.

19. The combination according to claim 18 wherein said picking elements on said first picking member are offset from said picking elements on said second picking member by 45°.

20. The combination according to claim 19 wherein said picking elements on each of said first and second picking members each extend substantially halfway into the space between said first and second picking members, so that plants to be harvested by the machine are pushed and pulled from one side to the other as said shaft rotates transversely over a row of plants.

21. The combination according to claim 1 further including means for rotating said shaft in a direction to cause the rotation of the picking elements to move said picking elements as such elements approach nearest the ground, in the same direction as the direction of movement of the machine.

22. The combination according to claim 21 wherein said picking elements on each of said first and second picking members each extend substantially halfway into the space between said first and second picking members, so that plants to be harvested by the machine are pushed and pulled from one side to the other as said shaft rotates transversely over a row of plants.

23. The combination according to claim 1 wherein said picking elements on each of said first and second picking members each extend substantially halfway into the space between said first and second picking members, so that plants to be harvested by the machine are pushed and pulled from one side to the other as said shaft rotates transversely over a row of plants.

24. The combination according to claim 1 further including a shroud on said machine over said harvesting member for preventing crops removed from plants by said picking elements from being thrown out of the machine.

25. A mechanized mobile harvesting machine including in combination:

a harvesting member with a rotatable shaft therein, said shaft mounted substantially parallel to the ground over which the machine is moved, and said shaft placed transversely of the direction of movement of the machine;

first and second spaced-apart picking members mounted for simultaneous rotation on said shaft, each of said first and second picking members located in planes substantially perpendicular to said shaft;

a plurality of arcuate picking elements on each of said first and second picking members, each of said picking elements extending a predetermined distance into the space between said first and second picking members; and endless belt conveyor means adjacent said picking members for removing crops harvested by the machine from the machine.

* * * * *